United States Patent [19]
Estrada

[11] Patent Number: 5,281,948
[45] Date of Patent: Jan. 25, 1994

[54] FOLDING SCHOOL BUS STOPPING ARM

[76] Inventor: Luis C. Estrada, 102 N. Ave. M, Lubbock, Tex. 79401

[21] Appl. No.: 874,125

[22] Filed: Apr. 24, 1992

[51] Int. Cl.⁵ ............................................... B60Q 1/26
[52] U.S. Cl. .................................... 340/433; 340/488; 340/480
[58] Field of Search ...................... 296/1.1; 293/9, 117; 116/28 R, 63 R; 340/433, 480, 488

[56] References Cited

U.S. PATENT DOCUMENTS

| | | | |
|---|---|---|---|
| 4,117,454 | 9/1978 | Fabry et al. | 340/433 |
| 4,559,517 | 12/1985 | Rahn | 340/433 |
| 4,559,518 | 12/1985 | Latta, Jr. | 116/28 RX |

*Primary Examiner*—Jeffrey Hofsass
*Attorney, Agent, or Firm*—Wendell Coffee

[57] ABSTRACT

A housing contains a gate or arm to extend to the driver's side of a school bus to stop vehicular traffic at the back of the bus. The housing and the arm are located at the back of the bus by attaching it to the rear bumper of existing bus. For new buses, the housing can be built into the body of the bus on the driver's side near the rear. A stop sign, at eye level, is also extended from the driver's side of the bus. In a preferred embodiment, the sign is extended responsive to the opening of the passenger door on the school bus. As soon as the sign begins its outward movement, flashing lights are activated, a sound alarm is activated. After a short delay, the gate in the form of an arm is extended from the housing. To retrieve the arm and sign, the arm is brought in first and as soon as the arm is retracted it activates a limit switch which begins the sign retraction and when the sign is retracted a limit switch will deactivate the flashing lights and audible device.

4 Claims, 8 Drawing Sheets

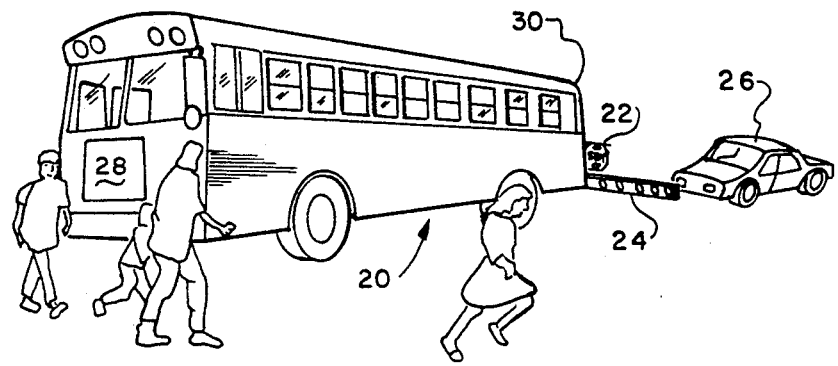
FIG-1
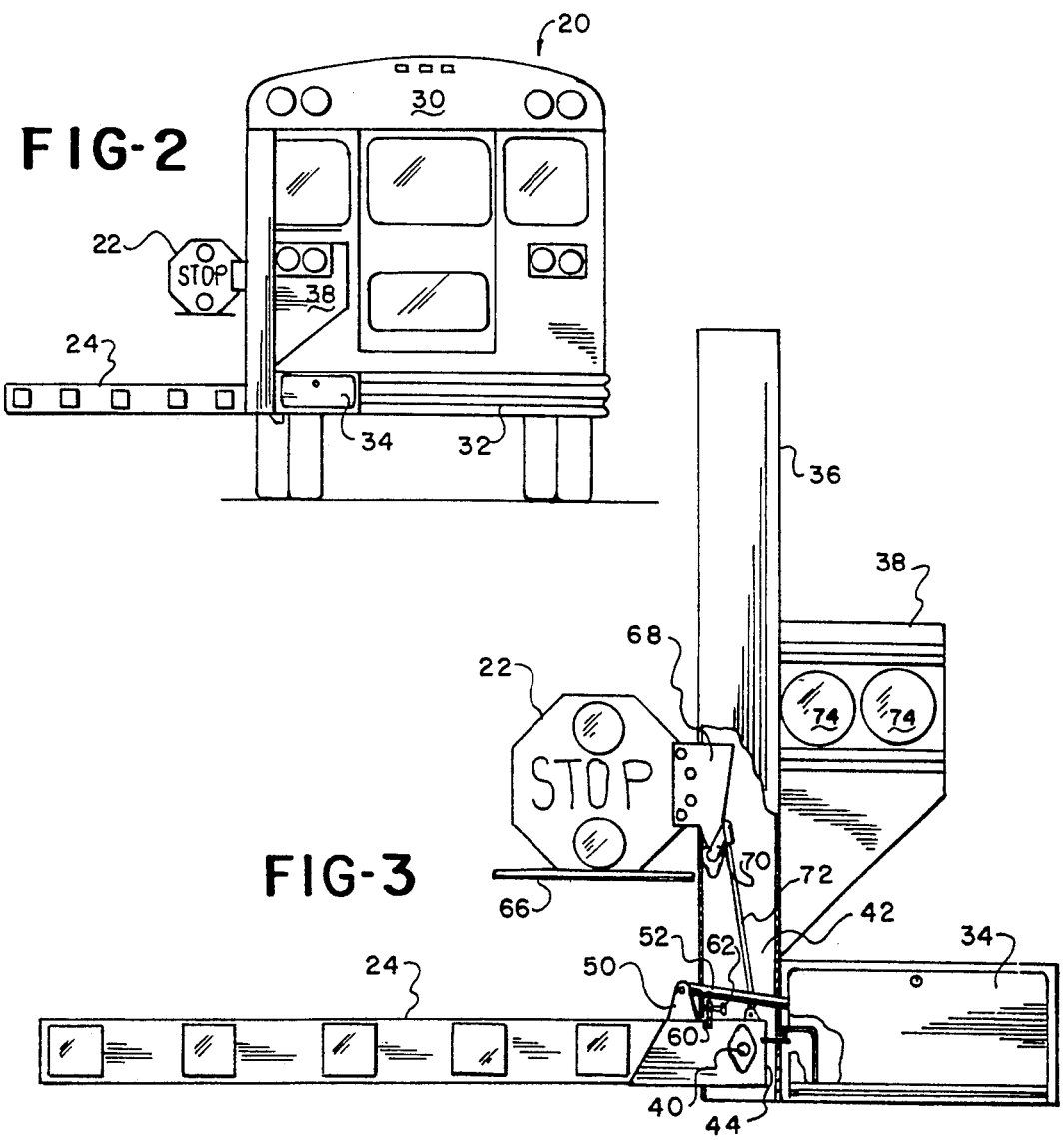
FIG-2
FIG-3

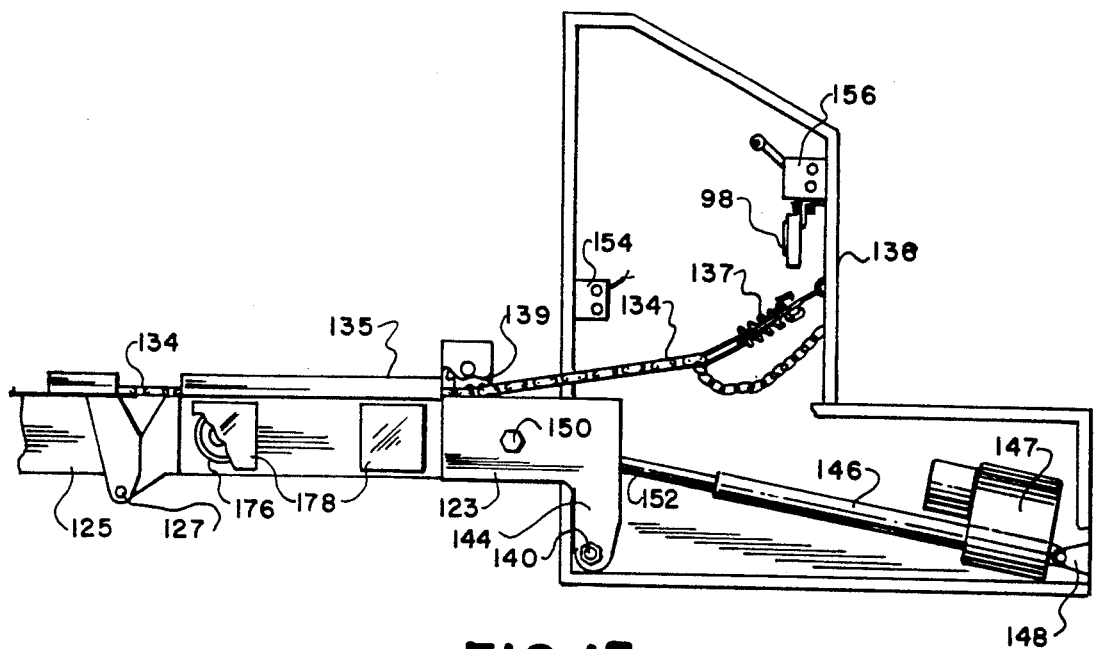
FIG-15
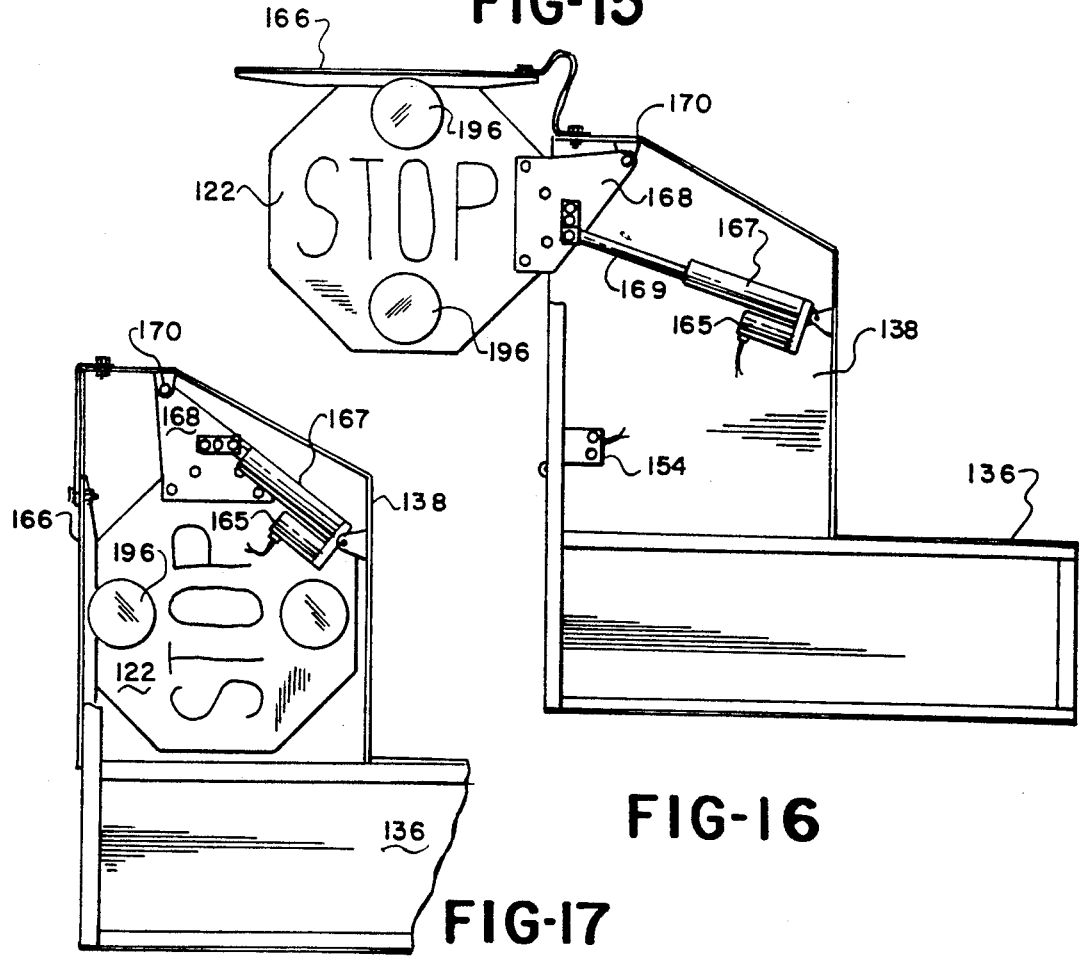
FIG-16
FIG-17

FOLDING SCHOOL BUS STOPPING ARM

CROSS REFERENCE TO RELATED APPLICATION

None, however, Applicant filed Disclosure Document No. 279,099 on Apr. 15, 1991, Disclosure Document No. 283,955 on Jun. 10, 1991, and Disclosure Document No. 293,180 on Oct. 15, 1991, which documents concern this application; therefore, by separate paper it is respectfully requested that the document be retained and acknowledgment thereof made by the Examiner. (MoPEP 1706)

BACKGROUND OF THE INVENTION (1) Field of the Invention

This invention relates to safety and more particularly to creating a zone of safety along the side of a stopped school bus during periods of boarding, or disembarking passengers.

(2) Description of the Related Art

A long-recognized problem exists in stopping traffic for school buses while passengers are boarding and disembarking. Normally the door for this purpose is on the right side of the bus next to the curbside while the driver sits on the left side of the bus. When the bus is stopped, often automobiles will pass to the left side of the bus, despite stop signs and other warnings.

STANTON U.S. Pat. No. 1,786,678 in 1930 disclosed an arm or gate to swing from the driver's side of the school bus to prevent this traffic. This gate was located adjacent to the driver's position near the front of the bus.

RUNKLE U.S. Pat. No. 3,153,398 in 1964 disclosed a gate which would swing directly in front of the bus along the door side of the bus. LATTA U.S. Pat. No. 1,559,518 in 1985 also disclosed a gate which swung directly ahead of the bus from the right side of the bus as did WICKER U.S. Pat. No. 4,697,541 in 1987. These gates from the door side of the bus were designed to prevent the passengers from the bus passing directly in front of the bus, where automobiles passing the bus on the driver's side could not see them as they stepped from immediately in front of the bus. All the gates of RUNKLE, LATTA and WICKER were designed to swing about a vertical axis so that the gates would sweep through a horizontal path and in the closed position would lie along the front bumper.

WICKER U.S. Pat. No. 4,956,630 in 1990 disclosed obstructing pedestrian traffic in front of a bus. Also disclosed in the LATTA and the two WICKER patents, are signs on the driver's side of the bus directing traffic to stop. These signs are distinguished from gates, inasmuch as the gates prevented traffic from passage wherein the signs only instructed traffic to stop.

WELLS U.S. Pat. No. 4,825,192 in 1989 disclosed a telescoping gate which telescoped within the front bumper to obstruct traffic from the front of the bus.

SUMMARY OF THE INVENTION (1) Progressive Contribution to the Art

This application discloses a gate to be mounted at the rear of the bus. In two of the embodiments, the gate is designed to attach to the rear bumper of the bus to be attached to existing bus. In one embodiment the gate is designed to fit into the side of the bus body at the rear. The gates are designed to barricade vehicular traffic on the driver's side of the bus. Also, a sign is displayed at the rear of the bus. In this manner a zone of safety is created which extends along the entire driver's side and in front of the bus. The gate is designed to prevent vehicular traffic from entering this zone of safety, which begins with the gate at the rear of the bus and extends forward therefrom.

The gates are attached by a horizontal pivot at the lower rear driver's side of the bus so that the gate in the retracted position is vertical along the back of the bus and is extended horizontally after sweeping through a vertical plane. In one embodiment, the sign has a length of about the height of the bus from the bumper to about the top of the bus. In two of the embodiments, the gate is folded so that it has a length, when extended, comparable to the single unfolded embodiment. In the retracted or stored position it is only about half that length.

In one embodiment, a sign is displayed simultaneously with the extension of the gate. In two of the embodiments a sign is first displayed; lights and audible signals issue warnings, shortly before the gate is extended. The warnings are both that the gate is being extended and passengers are disembarking.

Many school buses have pneumatic pressure readily available on the bus and therefore one embodiment has an air-powered extension. All school buses have electrical power available and therefore two of the embodiments are disclosed with electrical power to extend and retract the gates.

(2) Objects of this Invention

An object of this invention is to provide for increased safety of passengers disembarking or embarking a bus.

Another object is to create a zone of safety along the driver's side of the bus.

Further objects are to achieve the above by extending a gate from the driver's side at the rear of the bus.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is a perspective view of a school bus with a first embodiment of the invention shown in the extended position with automobile traffic blocked and pedestrian traffic safely crossing in front of the bus.

FIG. 2 is a rear elevational view of the first embodiment showing the gate and the sign extended.

FIG. 3 is a detailed rear elevational view of some of the mechanisms used to extend the sign and gate with the sign and gate extended, and the housing broken away for clarity.

FIG. 15 is a view similar to FIG. 14 showing the gate fully extended with the gate foreshortened and the sign not shown for clarity.

FIG. 16 is a view similar to FIG. 15 showing the sign fully extended.

FIG. 17 is a view similar to FIG. 16 showing the sign fully retracted.

Figure 4:
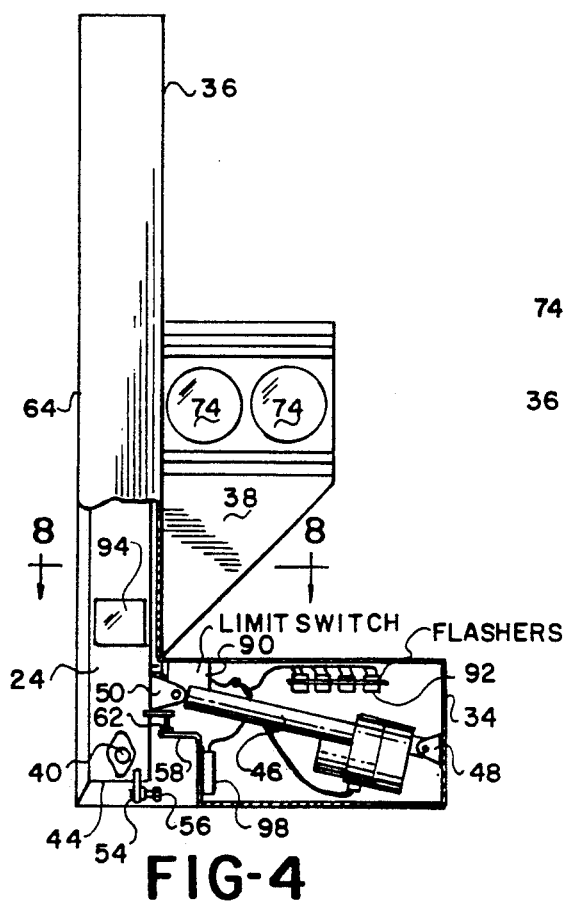
FIG. 4 is a view similar to FIG. 3 showing the gate and sign in a retracted position and showing some of the details of construction.

As an aid to correlating the terms of the claims to the exemplary drawing(s), the following catalog of elements and steps is provided:

20 school bus
22 stop sign or flag
24 gate or bar
26 motor vehicle
27 driver's side of school bus
28 front (of bus)
29 door side
30 back (of bus)
31 school bus door
32 rear bumper
34 equipment box
36 gate housing
38 sign housing
40 pivot pin
42 back (of gate housing)
44 bottom end (of gate 24)
46 pneumatic cylinder
48 ear, cylinder
50 ear, rod
52 hydraulic cylinder rod
54 projection (bottom of arm)
56 positioning bolt
58 flange
60 projection (top of arm)
62 positioning bolt
64 flange, gate
66 flange, sign
68 actuating support
70 crank arm
72 pitman
74 lamps
76 square tubular spacers
78 battery
80 compressed air reservoir
82 ignition switch
84 alarm switch
86 bus stop lamps
87 pneumatic valve
88 solenoid
90 limit switch
92 flasher
94 gate lamps
96 stop sign lamps
98 beeper
120 school bus
122 stop sign or flag
123 proximal portion
124 gate or bar
125 distal portion
126 automobile (opposite direction of travel)
127 pivot pin
130 back (of bus)
132 rear bumper
134 roller-link chain
135 tube or guide
136 main housing
137 spring
138 sign housing
139 roller
140 pivot pin
144 toe (of proximal portion)
146 electric screw
147 electric motor (gate)
148 motor ear
150 pivot
152 screw rod
154 limit switch (sign)
156 limit switch (arm)
158 flange
164 gate flange
165 electric motor, stop
166 flange
167 electric screw
168 bracket
169 motor-driven rod
170 pivot
172 blinker or flasher unit $T_2$
173 contacts $T_{2a}$
174 lamp
175 contacts $T_{2b}$
176 PVC pipe section
178 lens 180 bulb
182 delay timer (T₁)
184 instantaneous contacts (T₁ᵢ)
186 delay contact (T₁d)
188 stop sign relay (R₁)
190 gate motor relay (R₂)
196 lamp (sign)
199 zone of safety

DESCRIPTION OF THE PREFERRED EMBODIMENTS

Figure 23:
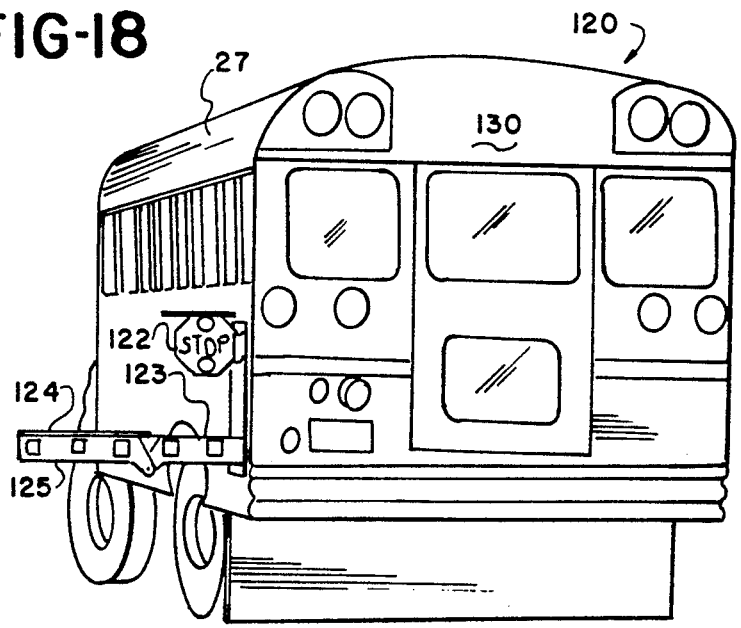
FIG. 23 is a rear perspective view of a school bus with a third embodiment illustrated.
Figure 22:
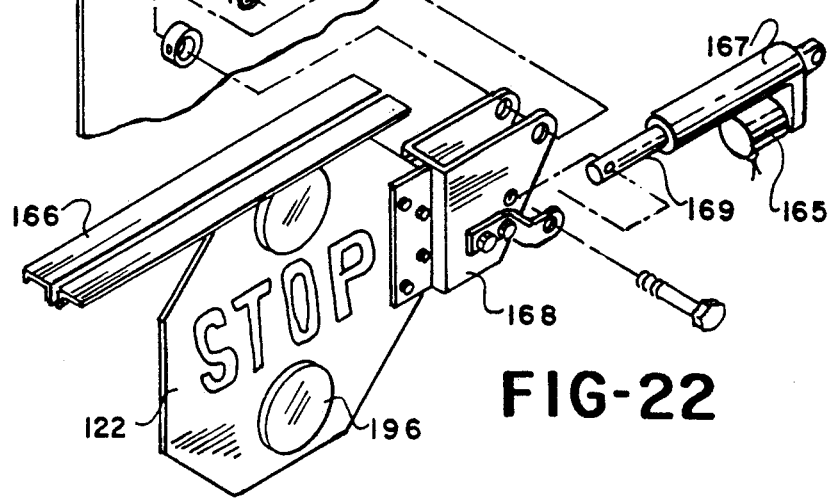
FIG. 22 is an exploded view of the sign of the second embodiment.

Referring to the drawings there may be seen school bus 20 with stop sign 22 and gate or bar 24 at the rear. The stop sign 22 is to instruct the driver of motor vehicle 26 to stop and the gate 24 is to emphasize that he should not proceed until the gate is lifted. The bus has front 28 and back 30. (FIGS. 1 & 23)

Referring to FIG. 2 there may be seen the back 30 of school bus 20. It is shown with the stop attachment to rear bumper 32 of the bus with the stop sign or flag 22 and gate 24 extended.

FIG. 3 discloses the attachment which would be attached to the back of the school bus and some of the mechanisms for operation thereof. Specifically the FIG. 3 shows equipment box 34. The equipment box 34 is bolted through its back to the bumper 32. Also included is gate housing 36 and sign housing 38. The gate is pivoted to the back of the gate housing 36 by pivot pin 40. The housing 36 including its back 42 is rigidly attached to the box 34 as by riveting or welding. Likewise the stop sign housing 38 is attached to the gate housing 36.

The pivot 40 is mounted a short distance from bottom end 44 of the gate 24. The bottom end of the gate 24 is identified as the bottom end when it is in the upright or vertical position as seen in FIG. 4. As may be seen particularly in FIG. 4 the equipment box has pneumatic cylinder 46 therein. The cylinder 46 is hinged to the box by ear 48 as seen in the drawings. The rod or extension of the cylinder 46 is attached to ear 50 which is mounted upon the side of the gate 24 when the gate 24 is in the stored position. The stored position is when the gate is within the gate housing 36. When the gate is in the extended position or horizontal position as seen in FIG. 3 the ear 50 will be upon the top. The ear 50 will be positioned upward from the pivot pin 40 in the housed position. Pneumatic cylinder rod 52 is seen in FIG. 3. Projection 54 extends downward from the bottom end 44 of the gate 24. Positioning bolt 56 is threaded through the projection 54. As may be seen in FIG. 3 when the arm 24 is in the out position, the positioning bolt rests against flange 58 (identified in FIG. 4) to position the gate in a horizontal position and to hold it in that position the extension of the piston rod 52 is not relied upon to hold the arm in position. Likewise a projection extends from the top of the arm, as seen in FIG. 4. Positioning bolt 62 extends from the top of the arm so that in the housed position of the arm 24 the bolt 62 rests against the top of the flange 58 to hold it in position.

Figure 5:
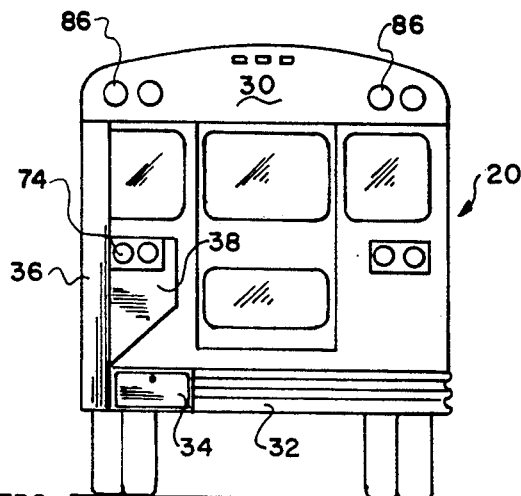
FIG. 5 is a rear elevational view of the bus with the gate and sign retracted.
Figure 8:
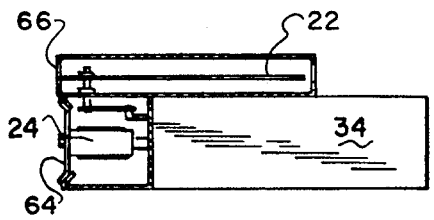
FIG. 8 is a sectional view taken substantially on line 8—8 of FIG. 4.
Figure 6:
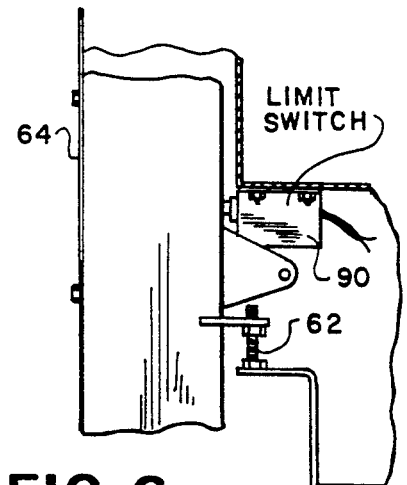
FIG. 6 is a detail view similar to FIG. 4 particularly showing the retracted stop and also the retracted limit switch.

FIG. 5 shows the back of the school bus 30 with the arm and flag in the retracted position within their housing. As will be explained more fully with the second embodiment, the sign has flange 64 which closes the opening of the housing 36 when it is in the housed position and the sign 22 has also flange 66 on its bottom which closes the door to the sign housing 38 when it is in the closed position.

The sign 22 has actuating support arm 68 attached to it which would be on its bottom in the stored position (not shown). The actuating support arm 68 is connected to crank arm 70 as seen in FIG. 3. The crank arm 70 is connected to the gate 24 below the pivot 40 by pitman 72. Therefore it may be seen, referring particularly to FIG. 3 and FIG. 4, that when the sign is in the extended position the pitman moves upward rotating the crank arm 70 to rotate the supporting arm 68 to an upright position thereby also extending the stop sign 22. Likewise when the gate 24 is raised the pittman 72 moves down rotating the crank arm 70 and the support 68 to retract the stop sign 22 and pull it within the housing 38.

It will be noted that the sign housing 38 will tend to cover the tail lights including the stop light and turn signal lights of the bus, so they are relocated as lights or lamps 74 upon the rear of the housing 38.

Figure 9:
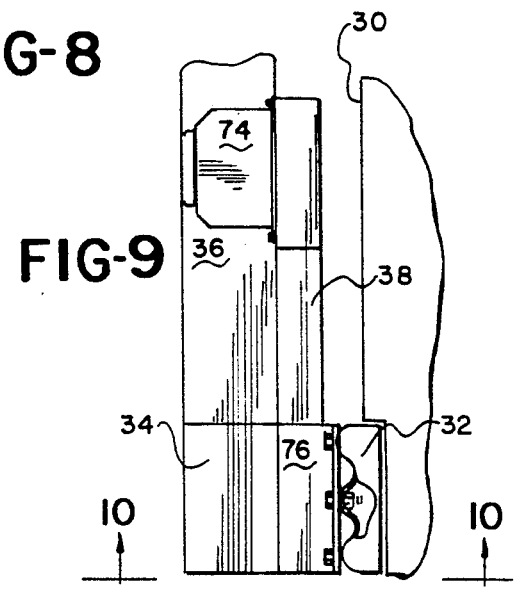
FIG. 9 is a partial side elevational view from the door side of the bus, particularly illustrating the mounting of the housing of the gate and sign onto the rear bumper of the school bus.
Figure 10:
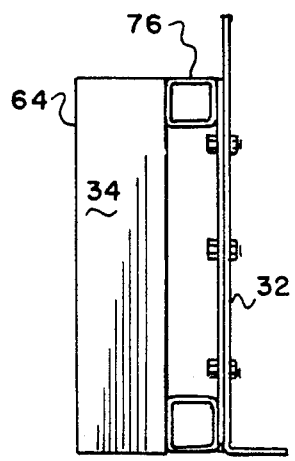
FIG. 10 is a bottom plan view taken as seen on line 10—10 of FIG. 9.

FIGS. 9 and 10 show the attachment of the box 34 and the housing 36 onto the brackets. It will be noticed that these are spaced away from the bumper 32 by square tubular spacers 76. It will be noted that by standard techniques of manufacture the bumper is mounted to the chassis as opposed to the back of the school bus 30. Therefore a space is provided between the housing 36 and the back 30 of the school bus 20 to prevent any motion between the two causing any damage.

Figure 7:
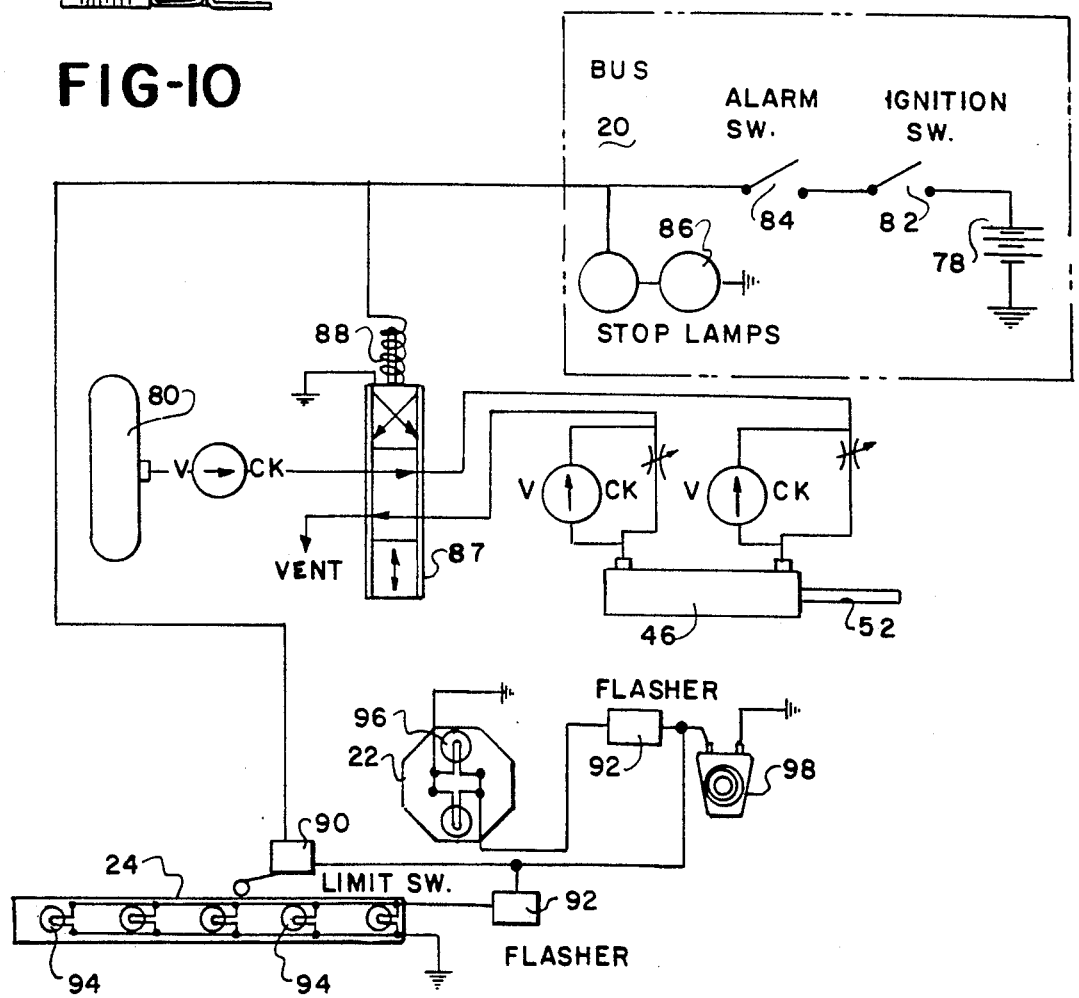
FIG. 7 is a schematic representation of some of the electrical and pneumatic system which operates the movement of the gate and sign and the activation of lights and audible signals.

FIG. 7 is an illustration of the pneumatic system as used with the embodiment of FIGS. 1 through 10. Referring to FIG. 7 there may be seen a schematic representation of the electrical and hydraulic circuits to control the first embodiment. Battery 78 furnishes electrical power and reservoir of air under pressure 80 furnishes pneumatic power. According to this embodiment ignition switch 82 must be closed to provide power to master switch or alarm switch 84. Connected to the alarm switch within the bus 20 are standard stop lights 86 which are customary on school buses. It may be seen from the schematic that as soon as the alarm switch 84 is closed, the pneumatic valve 87 will be activated by solenoid 88. Valve 87 in FIG. 7 is shown in the inactivated position. Although not shown, the valve will normally be spring biased so that it is in the inactivated position. In this inactivated position, pressure is applied to the cylinder 46 so that the cylinder rod 52 is in the retracted position as shown in the drawings in FIG. 4. It will also be seen that when the solenoid 88 is activated the valve, as seen in FIG. 7, will move downward to reverse the pressure upon cylinder 62 so that the gate 24 will be extended by the extension of the rod 52. The numerous check valves and flow regulating valves have not been numerically identified in the drawings, inasmuch as the pneumatic controls for the hydraulic cylinder 46 are basically standard.

In addition to the alarm switch 84 actuating the solenoid 88, it will also actuate limit switch 90. The limit switch 90 is seen in FIG. 4. The closing of the limit switch 90 will activate flashers 92. It may be seen that the flashers will cause the lamps 94 within the arm 24 and the lamps 96 within the sign 22 to blink. Stop lights alternately blinking on barricades and the flashers controlling them are well known. Further, the closing of the limit switch 90 will activate audible signal device or horn or beeper 98 which is mounted in the housing.

Figures 11, 12:
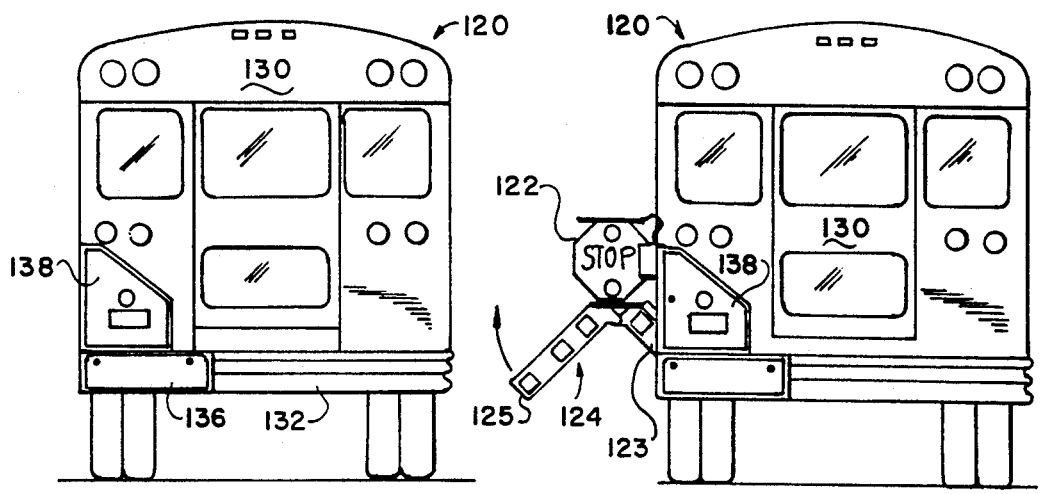
FIG. 11 is a rear elevational view of a bus with a second embodiment with the sign and gate in a retracted position.
FIG. 12 is a rear elevational view similar to FIG. 11 with the sign in the extended position and the gate partially extended.
Figure 13:
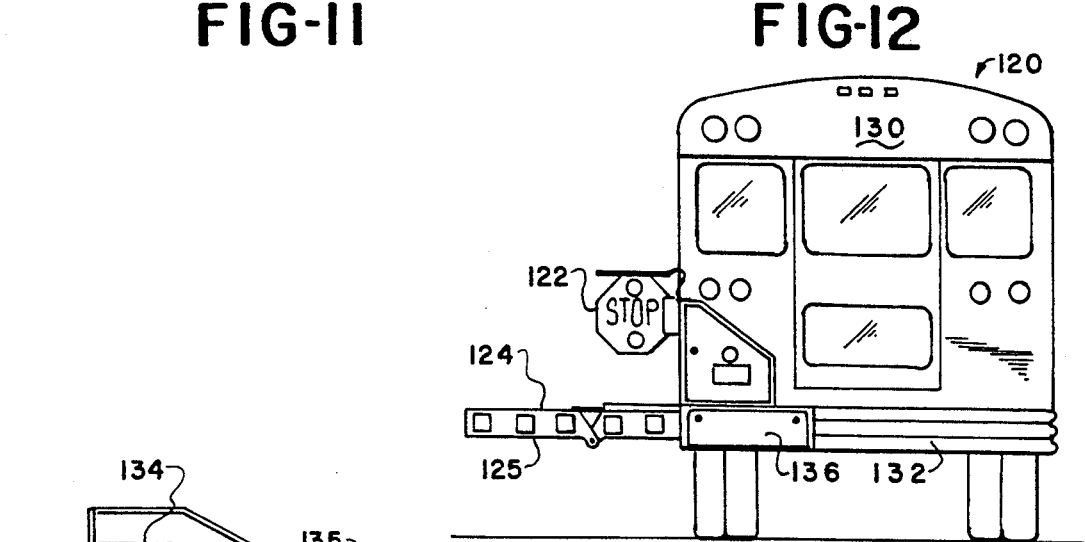
FIG. 13 is a rear elevational view similar to FIG. 11 with the sign and gate both fully extended.

FIG. 11 shows a second embodiment of the invention which would be attached to school bus 120 having back 130. This embodiment would have stop sign or flag 122 housed in the top portion 138 of housing 136. Gate or bar 124 is also housed in housing 138.

The housings 136 and 138 are mounted upon the rear bumper 132 of the bus 120. The gate 124 has two portions, a proximal portion 123 which is connected by pivot pin 140 to the housing 136, and a distal portion 125 is pivoted by pin 127 to the proximal portion 123. The proximal portion 123 has toe 144 which is offset at right angles from the proximal portion 123. The pivot pin 127, when the arms are in the extended position as seen in FIG. 15, is below the arms. Therefore when the arms are in the collapsed position as seen in FIG. 14, it may be seen that they are in a compact position requiring a minimum of housing space.

Screw rod 152 extends from electric screw 148 which is rotated by electric motor unit 147. The electric motor unit is connected to the housing 136 by motor ear 148. The end of screw rod 152 attaches to pivot 150.

Figure 14:
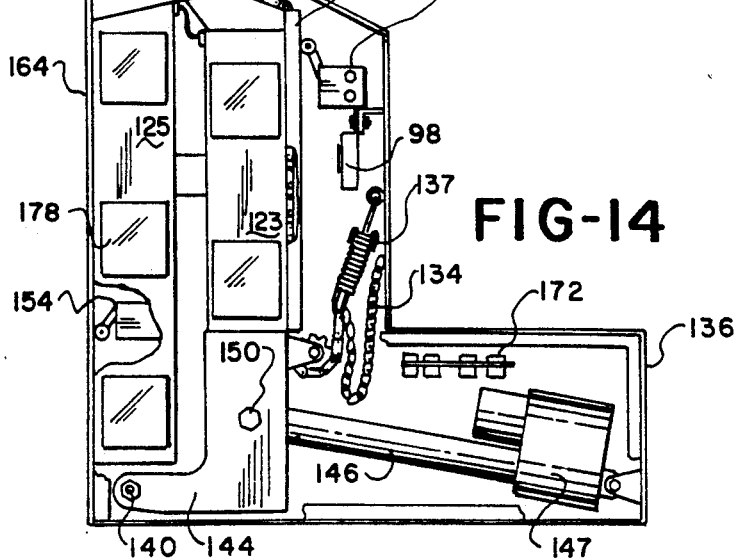
FIG. 14 is a rear elevational view of the second embodiment with the housing cover removed showing the gate in the fully retracted position with portions of the gate broken away to show the sign limit switch, the sign is not shown for clarity.
Figure 18:
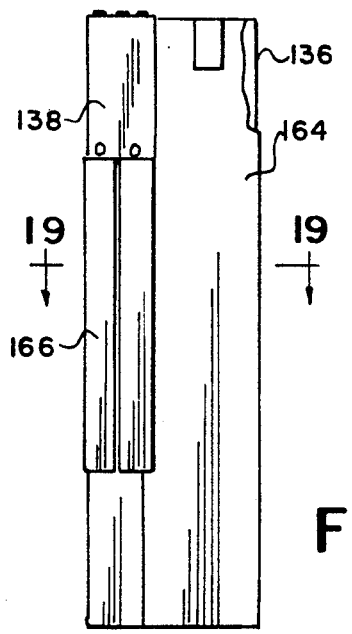
FIG. 18 is a side elevational view showing the housing with the sign and gate fully retracted.
Figure 20:
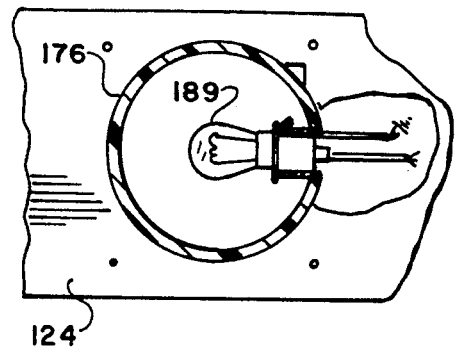
FIG. 20 is a detail of the light housing within the gate.
Figure 19:
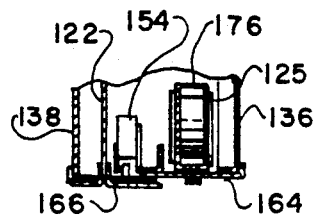
FIG. 19 is a partial sectional view taken substantially on line 19—19 of FIG. 18.

Therefore it may be seen that by proper actuation of the motor 147 and the extension and retraction of the rod 152 that the proximal arm 123 can be extended to a horizontal position, as seen in FIG. 15, or retracted to a vertical position as seen in FIG. 14.

The distal portion 125 requires an additional control which is provided by roller link chain 134 which is attached at its distal end to the top of the distal arm 125. It extends back through tube or guide 135 along the top of the proximal arm 123. The chain 134 is held with little or no slack in the chain when in the extended position by spring 137. The spring is actually a compression spring; however, because of conventional linkage, it acts to maintain tension in the chain 134. The spring 137 is connected to the housing 136. When it is in the extended position as seen in FIG. 15, the spring 137 through the chain 134 will hold the distal arm 125 horizontal. This horizontal position is maintained, inasmuch as the chain 134 is attached to the top of the distal arm 125 and the pivot 127 is below the bottom of the distal arm 125. For convenience and easy operation, the chain engages roller or idle sprocket 139. Therefore it may be seen with the tension chain 134 and the pivoted or hinged arm 124, the arm may extend from the side of the bus approximately twice the height of the housing, 136, therefore not requiring an excess height to the housing.

Referring to FIGS. 16 and 17 there may be seen the mechanism for operating the sign 122. The sign 122 is attached to bracket 168 which is connected to the housing 138 by a pivot 170. The sign 122 is moved from the retracted position of FIG. 17 to the extended position of FIG. 16 by operation of electric motor 165 rotating electric screw 167 which extends and retracts electric screw rod 169. As may be seen in FIGS. 16 and 17 the motor and screw assembly are attached by a pivot to the housing 138 and the rod is pivoted to bracket 168. The sign also carries flange 166 which closes the opening into the housing 138, similar to the previous embodiment.

Likewise the distal arm 125 has flange 164 attached to it to close the opening into the housing 136. As will be explained in greater detail, the operation first causes the stop sign to move out. Limit switch 154 is attached to the sign housing 138 so that it is changed to the open position when the sign is entirely enclosed within the housing. Upon movement of the sign from the encased position of FIG. 17 to the extended position of FIG. 16 the limit switch 154 will close. This might be used to actuate, upon a time delay, the operation of motor 147 to extend the gate 124. Arm limit switch 156 is mounted upon the housing 136. The arm limit switch 156 is normally open when the arm is retracted as shown in FIG. 14, and is closed when the arm is extended as shown in 15.

It is also desirable, if not necessary, to have lights within the arms 24, 123, and 125. They are conveniently provided by having short sections of PVC pipe 176 which extend from the front to the back of the arms. Colored lenses 178, preferably red, can cover the openings at each end of each pipe section 176. Electric incandescent bulb 180 within the short section of PVC pipe will signal persons either to the front or to the rear of the bus.

Figure 21:
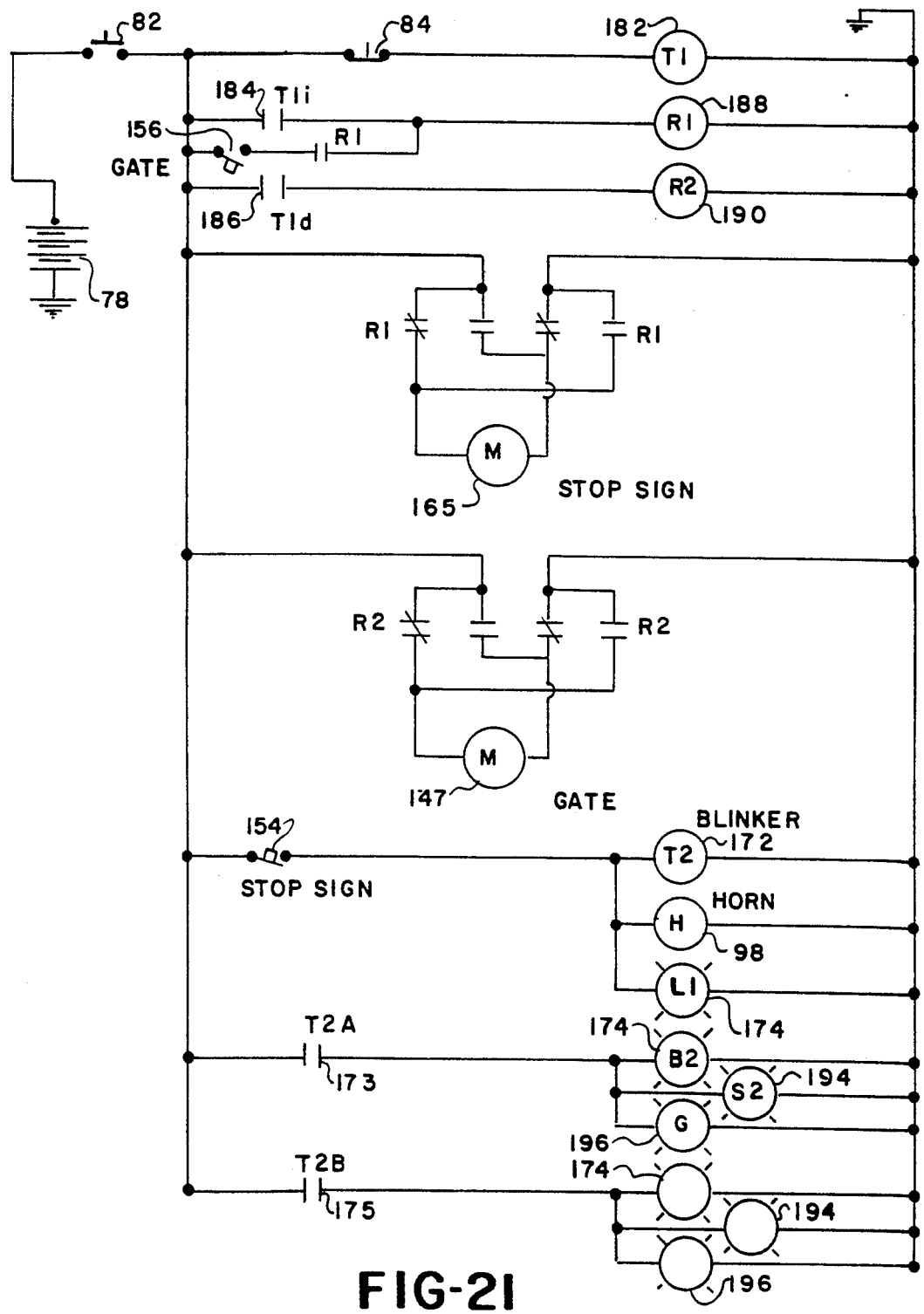
FIG. 21 is a schematic representation of the electrical circuits of the second embodiment.
Figure 24:
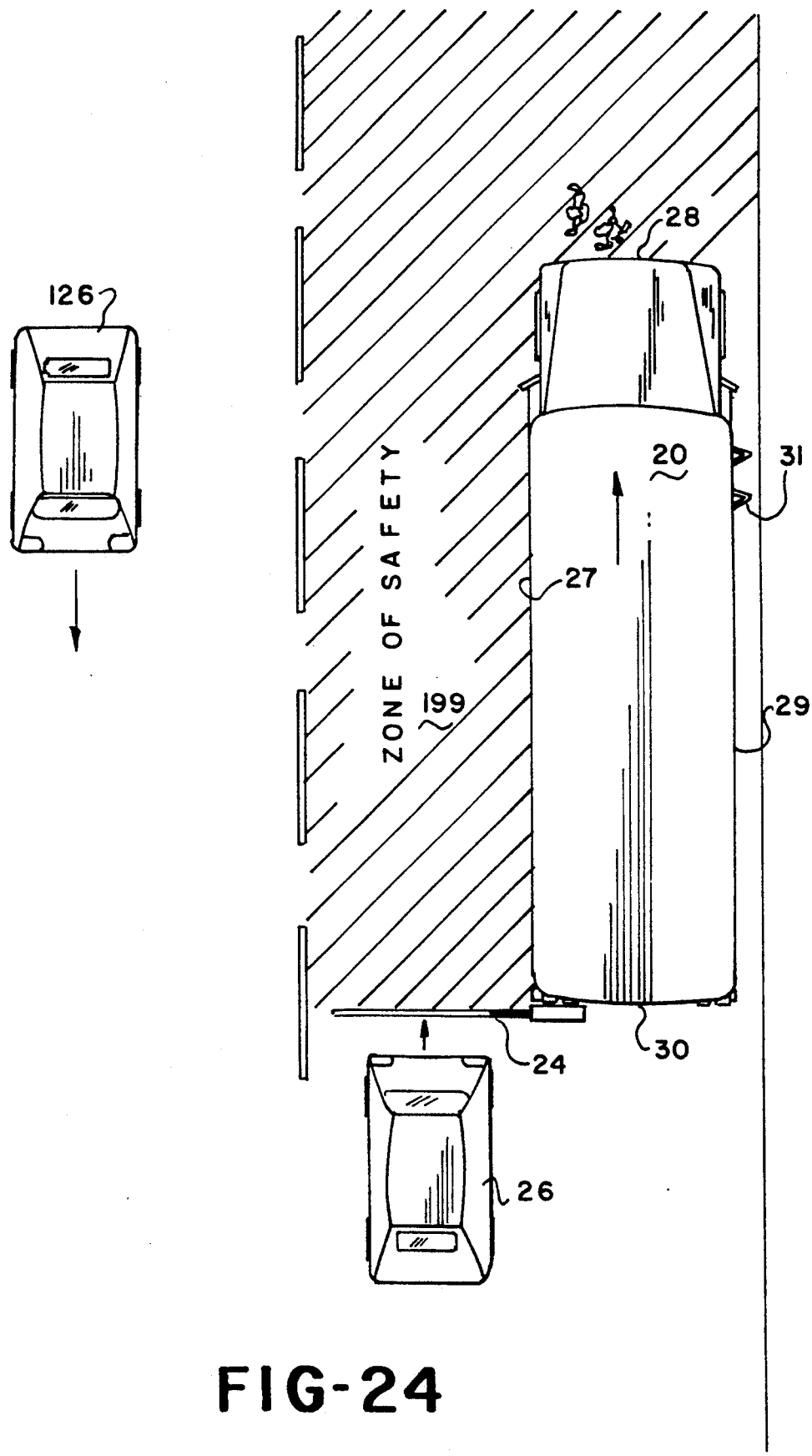
FIG. 24 is a top plan view of a bus and vehicular traffic showing the zone of safety.

Referring to FIG. 21 there may be seen the electrical systems. As before illustrated is the battery 78 which would normally be upon the bus and the master switch 82 which could be either the ignition switch or some other switch. The alarm switch 84 could either be a manual switch operated by the driver or it could be a limit switch which would be attached to the bus door 31 from which the passengers would disembark (FIG. 24).

Not shown in FIG. 21 are the normal stop lights 86 which are mounted on the bus but it is understood that if the switch 84 is a limit switch on the door 31 the switch 82 could also be a manual switch which would be activated by the driver as the driver was beginning to stop, the activating switch 82 would activate the lights 86 on the bus and also activate the warning switch 84. As discussed above the warning switch 84 could be a manual switch operated by the operator or could be an automatic switch such as the door switch. Activation of the warning switch 84 activates delay timer 182 shown on the drawing as ($T_1$). The timer ($T_1$) has two sets of contacts. One contact is an instantaneous contact 184 ($T_{1i}$) and the other is a delay contact 186 ($T_{1d}$).

The instantaneous contact 184 activates stop sign relay 188 ($R_1$). The stop sign relay is a double action relay. When ($R_1$) is activated this will close one set of contacts which causes stop sign motor 165 to rotate in a direction which extends the screw or rod 169 and therefor extends the stop sign 122. When the stop sign relay is open or released this will reverse the contact so that the stop sign motor 165 runs in the reverse direction to retract stop sign 122. The stop sign motor 165 has internal limit switches (not shown) to stop the stop sign in either the fully retracted position or the fully extended position. Also, the stop sign motor 165 has thermal switches to prevent damage to the motor in the event the movement of the sign is blocked before it reaches either the fully extended or fully retracted position.

As soon as the stop sign begins moving away from the fully retracted position the stop sign limit switch 154 closes. The closing of switch 154 will activate three separate items. One is the beeper or horn or audible signal device. Another is at least one lamp 174 on the arm which will burn constantly. The third is blinker mechanism or flasher or timer 172 ($T_2$). The timer 172 will have two sets of contacts which are alternately engaged. One set of contacts 173 ($T_{2a}$) will cause at least two bulbs 180 or lamps 174 upon the arm 124 and one of the lamps 196 upon the sign 122 to light. When the other timer contacts 175 ($T_{2b}$) is engaged the other lamps 174 will be lighted as well as the other lamp 196.

When the time delay contact 186 closes it will activate gate motor relay 190 ($R_2$). When gate motor relay 190 is activated it will close its contacts to gate electric motor 147. The contacts of relay 190 ($R_2$) are similar to the contacts of relay 188 ($R_1$) and contacts will alternate between forward and reverse. When the relay 190 is activated it will cause the motor 147 to operate in a direction to extend the gate and when the relay 190 is deactivated, it will act to reverse the motor. With reference to FIG. 21, it will be seen that when the bus door 31 is closed or the switch 84 manually opened, this will deactivate the timer 182 which will open the contacts 186 and thereby deactivating the relay 190 causing the gate 124 to retract.

When the gate moves outward the gate limit switch 156 will close. Assuming that ($R_1$) or relay 188 is activated its contacts in series with the limit switch 156 will be closed thereby locking ($R_1$) into the activated condition. Therefore analysis will show that as long as the gate is not fully retracted and assuming that relay 188 ($R_1$) has been initially activated, it will remain activated leaving the sign extended, the lights blinking, and the beeper 172 sounding. However, when the gate 122 is fully retracted and the limit switch 156 opened, this will open relay 188 to reverse the motor upon the stop sign 122 causing it to retract. When the stop sign is fully retracted this will open the switch 154 to turn off the lamps and silence the audible signal 172.

Referring to FIG. 23 there may be seen a third embodiment of this invention. This third embodiment is identical to the second embodiment having a sign 122 which extends from a housing as well as an articulated gate 124 which has distal arm and proximal arm 125 and 123. However, the third embodiment will not have the housing 138 but will be housed within the body of the bus itself. From this it will be seen that the third embodiment, that being the one shown in FIG. 23 would be a factory installed embodiment whereas the other two embodiments would be added to the rear bumper of the bus after the bus had been manufactured.

Reference is made to FIG. 24 to explain the operation of the device. There may be seen a bus 20 stopped at a curbside having door side 29 with doors 31. It would also have a driver's side 27 and a front 28 and rear 30 as explained above. At the time the bus 20 stopped and assuming that the activating switch was a limit switch upon the door 31 then the sign, such as sign 22 would extend, lights would flash, motorists would be warned and also any pedestrians in the area of the gate 24 would be warned, and a barricade would be established, which is to say that the vehicular traffic such as automobile 26 would be barricaded from entering the zone of safety 199.

It will be seen that any vehicular traffic moving in the opposite direction of the direction of traffic of the bus 20 such as automobile 126, although not barricaded would be warned to stop by the blinking lights on the extended gate 24 and stop sign. It may also be seen that the zone of safety would extend forward of the front of the school bus 28 as well as along the driver's side 27 of the school bus.

The zone of safety could be eliminated by closing the door 31 which would cause the gate 24 to be retracted, and upon its full retraction the stop sign 22 to be retracted, and the blinking lights and audible signals turned off.

The embodiments shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. The method of activating warning devices on a bus comprising the steps of:
   a. activating a warning signal from a driver's position of the bus,
   b. immediately beginning extending a stop sign from the side of the bus responsive to said warning signal activation,
   c. closing a sign switch responsive to said sign extension movement,
   d. sounding an alarm responsive to said sign switch closure,
   e. lighting stop lamps responsive to said sign switch closure, and
   f. responsive to said warning signal activation, after a time delay and after the alarm has been activated, beginning extending a gate from the side of the bus.

2. The method as defined in claim 1 further deactivating the warning devices by the steps of:
   g. de-activating the warning signal from the drivers position,
   h. retracting the gate responsive to said warning signal de-activating until the gate is in a retracted position,
   j. retracting the stop sign responsive the gate reaching a retracted position,
   k. continuing retracting the stop sign until the stop sign is in a retracted position,
   l. silencing the alarm responsive to the stop sign reaching the retracted position, and
   m. extinguishing the stop lamps responsive to the stop sign reaching the retracted position.

3. On a school bus having
   i. a driver side,
   ii. a passenger door opposite the drivers side,
   iii. a movable stop sign on the drivers side, and
   iv. a movable gate at the rear of the bus on the drivers side, an electrical circuit for controlling the extending and retracting of the sign and the gate laterally from the side of the school bus, said circuit comprising in combination with the above:
   a. a door switch mounted upon the passenger door of said school bus,
   b. a timing device connected to said door switch,
   c. said timer having a set of delay contacts which have a delayed response,
   d. a delay relay attached to said set of delay contacts, and
   e. a gate electric motor for extending the gate electrically connected to said delay relay,
   f. instantaneous contacts on said timing device, said instantaneous contact actuating
   g. an instantaneous relay,
   h. a sign electric motor to give a visual signal by extending said sign, said sign electric motor electrically connected to contacts of said instantaneous relay,
   j. a sign switch activated by movement of the sign,
   k. an audible signal device electrically connected to said sign switch,
   l. the timing device and delay relay forming a portion of means for delaying the extension of the gate until after the sign switch is activated, so that an audible signal is given and a visual signal is given that the gate is being extended laterally from the side of the bus.

4. The invention as defined in claim 3, further comprising:
m. a lamp electrically connected to said sign switch,
n. a blinker mechanism electrically connected to said sign switch,
o. at least two sets of lamps attached to said blinker mechanism,
p. said blinker device alternately lighting one or the other of said sets of lamps and said lamp lighting when said sign switch is activated.

* * * * *